United States Patent [19]

Lüchinger et al.

[11] Patent Number: 4,966,241
[45] Date of Patent: Oct. 30, 1990

[54] VESSEL HOLDING DEVICE FOR PRECISION BALANCES AND ANALYTICAL BALANCES

[75] Inventors: Paul Lüchinger, Uster; Eduard Fringeli, Bubikon, both, Switzerland

[73] Assignee: Mettler Instrumente AG, Greifensee, Switzerland

[21] Appl. No.: 420,340

[22] Filed: Oct. 12, 1989

[30] Foreign Application Priority Data

Nov. 29, 1988 [CH] Switzerland .......................... 4430/88

[51] Int. Cl.$^5$ ...................... G01G 21/22; A47B 73/00; A47G 23/02
[52] U.S. Cl. ...................................... 177/253; 211/74; 248/152
[58] Field of Search ................ 177/253, 262; 248/146, 248/152; 211/74, 71–73; 422/104

[56] References Cited

U.S. PATENT DOCUMENTS

| | | | |
|---|---|---|---|
| 558,433 | 4/1896 | Stoddard | 248/152 |
| 2,063,328 | 12/1936 | Morcom | 248/152 |
| 2,087,510 | 7/1937 | Glutz | 177/253 X |
| 2,988,333 | 6/1961 | Mesic | 248/146 X |
| 3,437,193 | 4/1969 | Freeman | 248/152 X |
| 3,461,728 | 8/1969 | Paoli | 248/146 X |
| 4,482,522 | 11/1984 | Baudish et al. | 211/74 X |
| 4,832,295 | 5/1989 | Wagner | 248/152 |

FOREIGN PATENT DOCUMENTS

| | | | |
|---|---|---|---|
| 301685 | 12/1928 | United Kingdom | 422/104 |
| 0320172 | 10/1929 | United Kingdom | 177/262 |

Primary Examiner—George H. Miller, Jr.
Attorney, Agent, or Firm—Toren, McGeady & Associates

[57] ABSTRACT

A vessel holding device is composed of a sheet metal strip which is bent to form a polygon. The resulting side wall members are provided with bores or recesses for holding the vessels, such as, test tubes or syringe cylinders in a predetermined manner. The vessel holding device can be used standing on one of the side wall members or on the upper or lower edges of the device.

14 Claims, 2 Drawing Sheets

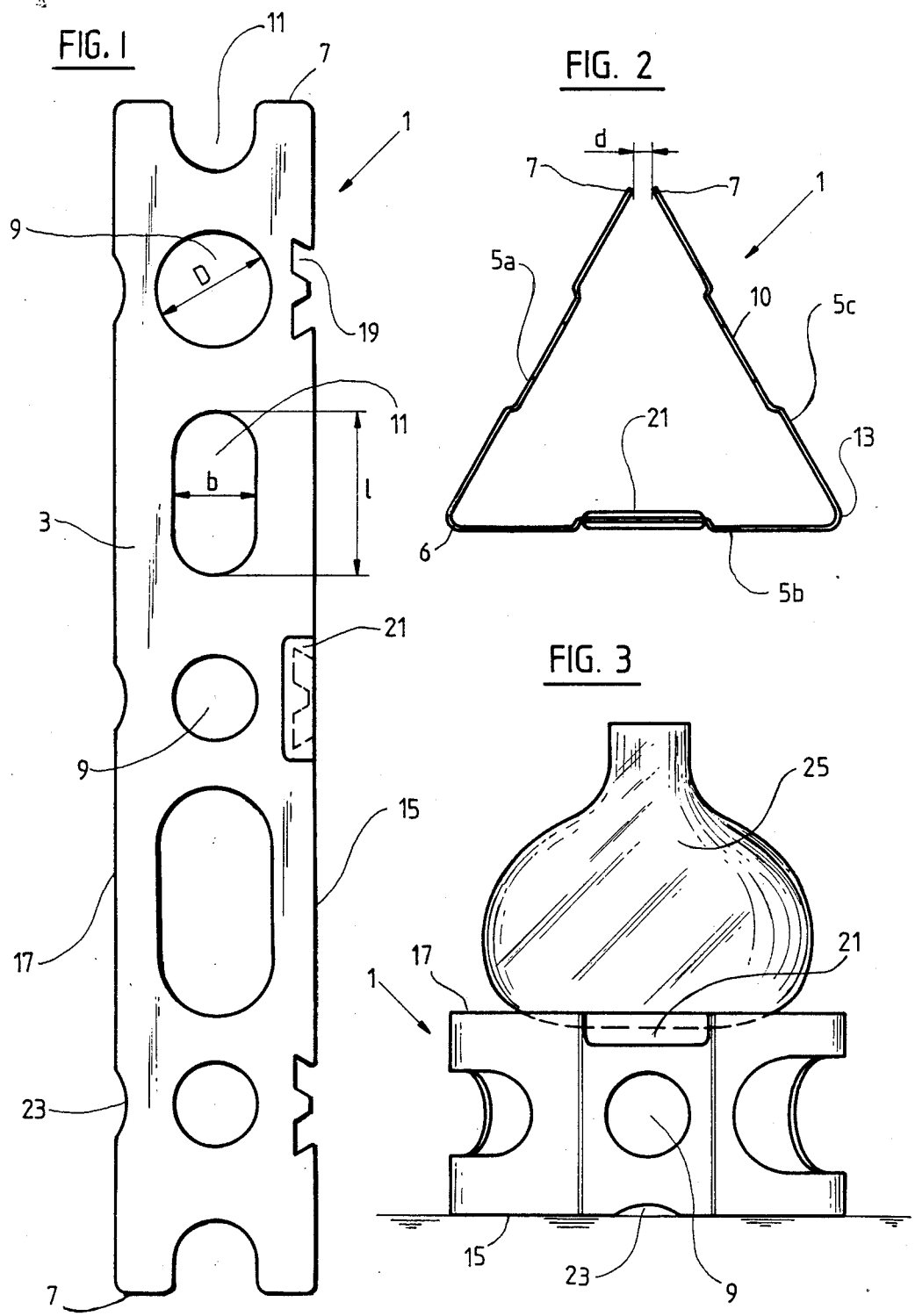

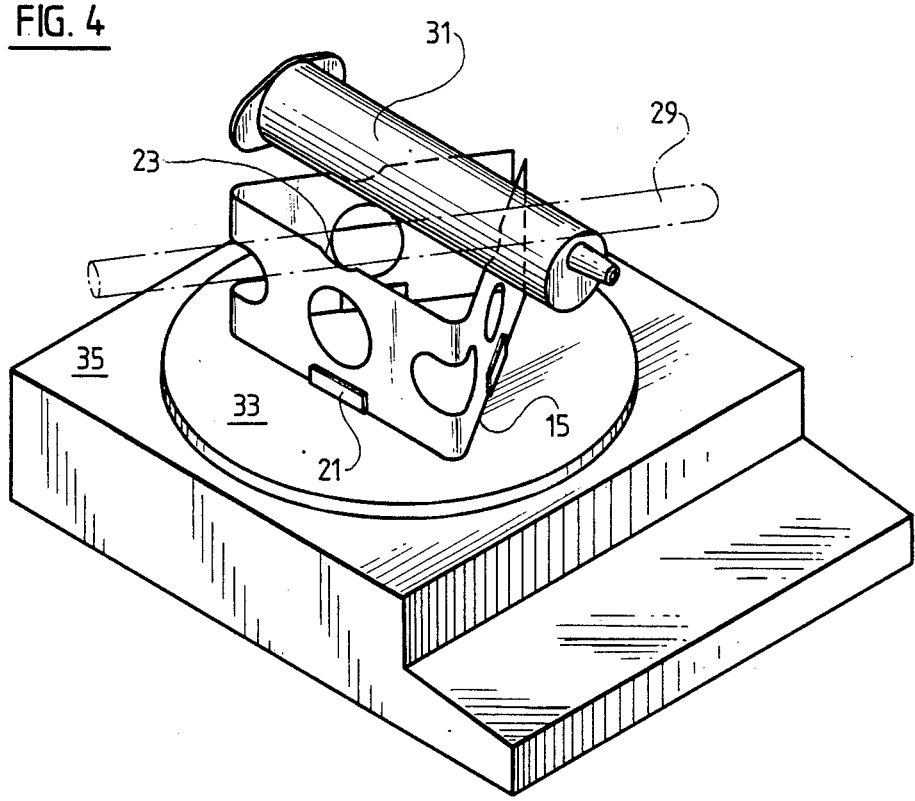
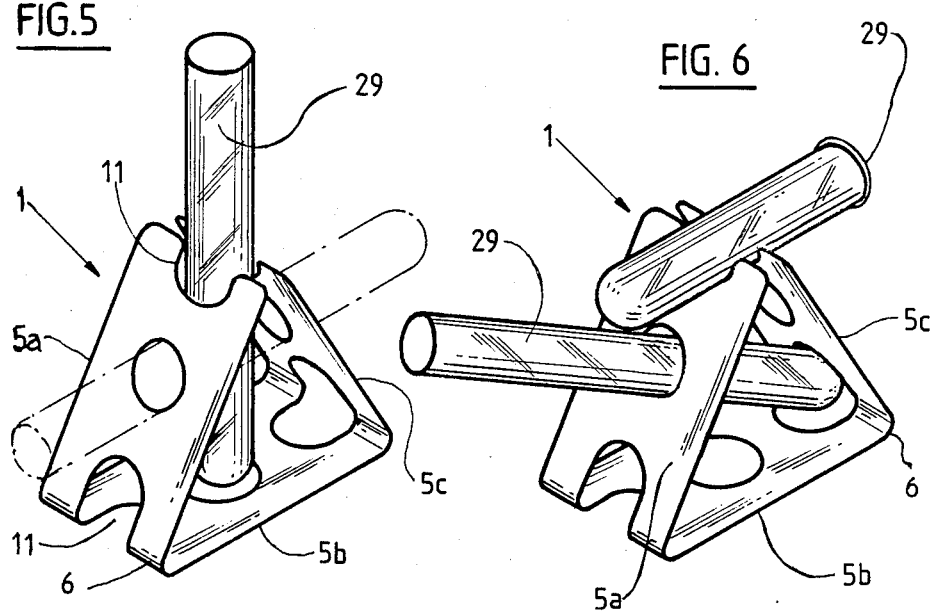

4,966,241

VESSEL HOLDING DEVICE FOR PRECISION BALANCES AND ANALYTICAL BALANCES

BACKGROUND OF THE INVENTION

1. Field of the Invention

The present invention relates to a device for holding or supporting vessels in precision balances and analytical balances.

2. Description of the Related Art

When weighing procedures are carried out in the laboratory, the material to be weighed is frequently not placed directly on the weighing dish, but is weighed in a vessel which is placed on the weighing dish. It is cumbersome to weigh with vessels, such as, round-bottom flasks, test tubes, syringe cylinders, etc., because these vessels do not have a surface to stand on and tilt over causing the contents to be spilled or have the tendency to roll off the weighing dish.

A weighing dish attachment as a stand for round-bottom flasks is known from German Utility Model G 88 01 055.4. The weighing dish attachment described in this German Utility Model consists of an annular piece of sheet metal which has at least three raised portions. A round-bottom flask can be securely supported on these three raised portions. This known weighing dish attachment is perfectly suitable for round-bottom flasks. However, vessels of different shape cannot be received by this attachment.

It is, therefore, the primary object of the present invention to provide a vessel holding device which is capable of securely holding differently shaped vessels which are used in the laboratory.

SUMMARY OF THE INVENTION

In accordance with the present invention, a vessel holding device of the above-described type has at least three side wall members which are arranged at an angle relative to each other and which are provided with means for receiving vessels.

When the vessel holding device according to the present invention is placed with the longitudinal edges of its side wall members on the weighing dish, the holding device is capable of securely supporting round-bottom flasks of various diameters and in various positions. Non-slip bodies placed on the upper longitudinal edges prevent the round-bottom flask from turning when the neck of the flask is not vertical. Bores provided in the side wall members can receive cylindrical containers, for example, test tubes or syringe cylinders, in horizontal or inclined positions.

When the vessel holding device is placed with one of its side wall members lying on the weighing dish, cylindrical vessels can also be supported in horizontal or inclined positions. If the vessel holding device is made of a spring elastic sheet metal, it is possible to support vessels loosely or in a clamped manner between the ends of adjacent side wall members which are not connected to each other.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

BRIEF DESCRIPTION OF THE DRAWING

In the drawing:

FIG. 1 is a development of a vessel holding device according to the present invention made of sheet metal;

FIG. 2 is a top view of the vessel holding device of FIG. 1 shaped into a triangle;

FIG. 3 is side view of the vessel holding device of FIG. 2 with a round-bottom flask placed thereon; and FIGS. 4 to 6 are schematic illustrations of the vessel holding device with vessels being supported in various positions.

DESCRIPTION OF THE PREFERRED EMBODIMENT

FIG. 1 of the drawing shows the vessel holding device 1 made of sheet metal prior to bending. The vessel holding device 1 is preferably made of a sheet metal strip 3 of chrome-nickel steel. As shown in FIG. 2, the strip 3 is bent into a triangle with three essentially rectangular side wall members or side wall portions 5a, 5b, 5c which are connected to each other at at least two corners 6. Of course, it is also possible to bend the strip 3 to a polygon having more than three side wall members 5a, 5b, 5c. Preferably, the ends 7 of the strip 3 are not connected to each other and are spaced from each other by a distance d.

The center of each side wall member 5 is provided with a round hole 9. The holes 9 may have the same or different diameters D. The strip 3 is further provided between the preferably round holes 9 with oblong holes 11 which again each may have a different length 1 and width b. When the strip 3 is bent, the oblong holes 11 are located in the region of the corners 13.

The strip 3 has a lower edge 15 and an upper edge 17. Suitable incisions 19 for mounting non-slip bodies 21 are provided along the upper edge 17 in the region of the holes 9. The lower edge 15 has at the same locations recesses or indentations 23 which, as shall be described below, serve to support cylindrically-shaped vessels.

The side wall members 5a, 5b, 5c may additionally have portions 10 which are rearwardly or inwardly offset in the region of the holes 9 relative to the remaining portions of the side wall members. The portions 10 are provided in order to ensure that, after the non-slip bodies 21 which are preferably of a plastic material or rubber are mounted, the vessel holding device 1 can be placed with side wall member 5b on a surface and can rest essentially with the entire surface thereof securely on the surface (compare FIG. 2).

The use of the vessel holding device 1 according to the present invention shall be explained below with the aid of FIGS. 3 to 6.

In FIG. 3, the vessel holding device 1 stands on its edge 15 of the side wall members 5a, 5b, 5c. In this position, the non-slip bodies 21 are located at the top and form the support for a round-bottom flask 25. This flask is supported at three points on the vessel holding device 1 and is held in this position so as to be secure against sliding.

When the vessel holding device 1 is turned around so that the side wall members stand on edge 17, a test tube 29, a syringe cylinder 31 or another body can be placed horizontally in the recesses 23 (compare FIG. 4). Of course, the vessels can also be supported inclined relative to the horizontal by placing the closed end thereof not on edge 17 but on the weighing dish 33 of a balance 35.

FIG. 5 of the drawing shows the vessel holding device 1 placed on its middle side wall portion 5b. The two other side wall portions 5a and 5c extend at an angle of approximately 60° to the sidewall member 5b and form an upright triangle. In this position, it is possible to support securely test tubes 29 on the balance 35 in vertical, horizontal or inclined positions. It is further possible to securely support vessels having different diameters since the holes 9 also have different diameters D and are suitable for different types of vessels.

When the two ends 7 of the strip 3 which are not connected to each other are located at the top, these ends 7 can be used for placing a vessel thereon or for clamping a vessel therebetween. As a result, it is possible to hold in a vertical position a triangular object or another polygonal object without there being the danger that the object tilts over when it is being filled.

The vessels supported in different positions or inserted in different positions can easily be filled with material to be weighed without falling over or rolling away when being accidentally touched.

As in the case in the vessel holding device 1 shown in FIGS. 2 and 3, the vessel holding device 1 according to FIGS. 4 and 5 may also have an inwardly offset portion 10.

Of course, it is possible to provide instead of the round holes 9 polygonal cutouts or cutouts having any desired shape. It is further possible to manufacture the vessel holding device 1 of plastic material or to coat it with plastic material.

While a specific embodiment of the invention has been shown and described in detail to illustrate the application of the inventive principles, it will be understood that the invention may be embodied otherwise without departing from such principles.

We claim:

1. A device for holding vessels in precision balances, the device comprising at least three side wall members which are arranged at an angle relative to each other and vessel receiving means provided on the side wall members, wherein the at least three side wall members are arranged in a triangle, the side wall members being rectangular and each side wall member having narrow sides, the three side wall members being connected at least at two narrow sides.

2. The device according to claim 1, wherein the narrow sides which are not connected to each other are arranged at a distance from each other.

3. The device according to claim 1, wherein the side wall members define in the region of the narrow sides an oblong hole each.

4. The device according to claim 3, wherein the oblong holes in the side wall members have equal lengths.

5. The device according to claim 3, wherein the oblong holes in the side wall members have different lengths.

6. The device according to claim 3, wherein the oblong holes in the side wall members have equal widths.

7. The device according to claim 3, wherein the oblong holes in the side wall members have different widths.

8. The device according to claim 2, wherein the side wall members are of steel, non-ferrous metal or light metal or plastics material.

9. A device for holding vessels in precision balances, the device comprising at least three side wall members which are arranged at an angle relative to each other and vessel receiving means provided on the side wall members, wherein each side wall member defines at least one hole as a vessel receiving means, the device having upper and lower longitudinal edges, an indentation being provided at the lower longitudinal edge.

10. The device according to claim 9, wherein a non-slip body is mounted on the upper longitudinal edge.

11. The device according to claim 10, wherein the side wall members have in the area of the non-slip body an inwardly offset portion.

12. The device according to claim 9, wherein the holes in the side wall members have equal diameters.

13. The device according to claim 9, wherein the holes in the side wall members have different diameters.

14. The device according to claim 9, wherein the side wall members are of steel, non-ferrous metal or light metal or plastics material.

* * * * *